(12) United States Patent
Mashburn et al.

(10) Patent No.: US 11,969,679 B2
(45) Date of Patent: Apr. 30, 2024

(54) SURFACE-ENHANCED COPPER FILTER FOR AIR PURIFICATION AND SYSTEM AND METHOD FOR USING

(71) Applicants: Matthew Mashburn, Dallas, TX (US); Johnny Brewer, Bowie, TX (US)

(72) Inventors: Matthew Mashburn, Dallas, TX (US); Johnny Brewer, Bowie, TX (US)

(*) Notice: Subject to any disclaimer, the term of this patent is extended or adjusted under 35 U.S.C. 154(b) by 469 days.

(21) Appl. No.: 17/206,417

(22) Filed: Mar. 19, 2021

(65) Prior Publication Data
US 2022/0297039 A1 Sep. 22, 2022

(51) Int. Cl.
*B01D 46/00* (2022.01)
*B01D 39/12* (2006.01)
*B01D 39/20* (2006.01)
*B01D 46/52* (2006.01)

(52) U.S. Cl.
CPC ......... *B01D 39/12* (2013.01); *B01D 39/2041* (2013.01); *B01D 46/0001* (2013.01); *B01D 46/0005* (2013.01); *B01D 46/0028* (2013.01); *B01D 46/0032* (2013.01); *B01D 46/521* (2013.01); *B01D 2239/0613* (2013.01); *B01D 2239/0618* (2013.01); *B01D 2279/50* (2013.01); *B01D 2279/65* (2013.01)

(58) Field of Classification Search
CPC .. B01D 46/521; B01D 46/0005; B01D 39/12; B01D 39/2041; B01D 46/0001; B01D 46/0028; B01D 46/0032; B01D 2239/0613; B01D 2239/0618; B01D 2279/50; B01D 2279/65; B01D 46/0002
See application file for complete search history.

(56) References Cited

U.S. PATENT DOCUMENTS

| | | | |
|---|---|---|---|
| 3,375,640 | A | 4/1968 | Pelosi |
| 3,812,370 | A | 5/1974 | La Violette |
| 4,778,496 | A | 10/1988 | Conrad |
| 4,838,910 | A | 6/1989 | Stollenwerk |
| 5,399,319 | A | 3/1995 | Schoenberger |
| 6,517,428 | B1 | 2/2003 | Murray |
| 6,736,133 | B2 | 5/2004 | Bachinski |
| 7,132,003 | B2 | 11/2006 | Hirayama |
| 7,168,427 | B2 | 1/2007 | Bachinski |

(Continued)

FOREIGN PATENT DOCUMENTS

| CN | 114367152 A | * | 4/2022 |
|---|---|---|---|
| KR | 102352866 B1 | * | 1/2022 |

(Continued)

*Primary Examiner* — Robert Clemente
(74) *Attorney, Agent, or Firm* — Hemingway & Hansen, LLP; D. Scott Hemingway; Elizabeth P. Hartman

(57) ABSTRACT

A surface-enhanced copper filter for air purification and a filter assembly with a surface-enhanced copper filter composed, at least in part, of substantially pure copper. The surface-enhanced copper filter uses the anti-microbial and electrostatic properties of elemental copper to inactivate biological contaminants and remove biological contaminants and other pollutants from the air. Also disclosed is a system and method using a filter assembly having a surface-enhanced copper filter to purify air. The disclosed surface-enhanced copper filter can be used in a stationary or mobile HVAC system or in a mobile air purification system.

20 Claims, 5 Drawing Sheets

(56) References Cited

U.S. PATENT DOCUMENTS

| | | |
|---|---|---|
| 7,802,443 B2 | 9/2010 | Wetzel |
| 8,562,913 B2 | 10/2013 | Searle |
| 8,974,565 B2 | 3/2015 | Cecchi |
| 9,694,308 B2 | 7/2017 | Michael |
| 10,233,933 B2 | 3/2019 | Wang |
| 10,422,727 B2 | 9/2019 | Pliskin |
| 2007/0021050 A1 | 1/2007 | Kennedy |
| 2008/0092745 A1 | 4/2008 | Tsao |
| 2008/0286163 A1 | 11/2008 | Garfield |
| 2011/0185895 A1 | 8/2011 | Freen |
| 2014/0238243 A1 | 8/2014 | Jardine |
| 2017/0312685 A1 | 11/2017 | Knapke |
| 2018/0207572 A1* | 7/2018 | Grimes .............. B01D 46/4245 |
| 2020/0094177 A1 | 3/2020 | Moon |
| 2022/0305417 A1* | 9/2022 | Tharval ................ C08K 5/0091 |

FOREIGN PATENT DOCUMENTS

| | | |
|---|---|---|
| KR | 20220135341 A * | 10/2022 |
| KR | 102533354 B1 * | 5/2023 |

\* cited by examiner

SURFACE-ENHANCED COPPER FILTER FOR AIR PURIFICATION AND SYSTEM AND METHOD FOR USING

CROSS REFERENCE TO RELATED APPLICATIONS

Not applicable.

STATEMENT REGARDING FEDERALLY SPONSORED RESEARCH OR DEVELOPMENT

Not applicable.

TECHNICAL FIELD OF INVENTION

This invention relates to the field of air purification, and system and method for purifying air with a surface-enhanced copper filter.

BACKGROUND OF THE INVENTION

Indoor Air Quality (IAQ) refers to the air quality within and around buildings and structures. Pollutants in indoor air are often two to five times greater than is found in outdoor air. Poor air quality can affect the health and comfort of building occupants. Controlling common indoor pollutants can help reduce the risks associated with indoor health concerns.

Poor indoor air quality (IAQ) has been linked to a number of symptoms such as headaches, trouble concentrating, fatigue, dry cough, dry or itchy skin, dizziness, nausea, and irritation of the eyes, nose, throat and lungs. Some diseases have been linked to specific air contaminants or indoor environments, like asthma with contaminated or damp indoor environments. In addition, some types of exposures, such as to asbestos and radon, do not cause immediate symptoms but may lead to cancer years after exposure.

Biological contaminants are a large source of pollutants affecting indoor air quality. These biological contaminants include bacteria, fungi, mildew, viruses, pollen, dust mites, insects, and animal materials such as dander, saliva, urine and feces. Pollens originate from plants and are usually brought indoors on people and pets. Viruses and bacteria can be transmitted by people, animals and soil. Household pets, as well as vermin like mice and rats, are sources of dander, saliva, urine and feces. If a central air handling system becomes contaminated, it can become a breeding ground for fungi, bacteria, and mildew, and a reservoir for other sources of biological contaminants—all of which can be distributed throughout a building's central air handling system.

Airborne biological contaminants can be particularly difficult to eradicate from indoor spaces because of their prevalence in the environment and indoor environmental factors such as dampness, especially in enclosed spaces. Viral illnesses, such as influenza, measles, colds and chicken pox, among others, can be transmitted through the air. Fungi and mildews thrive in damp conditions and can release spores and potentially disease-causing toxins. Some biological contaminants can also trigger allergic reactions, including asthma. Health problems caused by biological contaminants include respiratory symptoms, such sneezing, watery eyes, coughing, shortness of breath, as well as potentially causing dizziness, lethargy, and fever.

Problems associated with poor indoor air quality have become prevalent enough in recent years that terms have been coined to describe these problems. One, Sick Building Syndrome (SBS), describes situations where building occupants experience acute health and comfort problems that seem to be linked to time spent in a building, but specific causes for the symptoms have not been identified. Complaints may be localized to a particular room or area, or may encompass an entire building. Another, Building Related Illness (BRI) is used when symptoms of diagnosable illness have been identified and are directly attributed to airborne building contaminants. Causes of building-related illnesses is typically linked to the environment of airtight, energy-efficient buildings, which depend on heating, ventilation, and air conditioning (HVAC) systems for circulation of air.

On-site air cleaning and filtration methods, including air filters, electrostatic Electronic Air Cleaners (EAC), ionizers, ozone generators, and ultra-violet lights, have been used to purify air and improve indoor air quality, but the currently available systems all fail in one or more areas, particularly in the eradication and removal of biological contaminants. What is needed is a more efficient and effective means for solving indoor air quality problems, particularly with respect to more effective and efficient methods and systems for removal or modification of pollutant sources when feasible, increasing ventilation rates and air distribution, and on-site air cleaning and filtration.

Air filters are typically used in central HVAC systems. The air filters currently available are inadequate for collecting pollutants smaller than dust, skin cells, hair and large particles of pollen, and are woefully insufficient when it comes to collecting bacteria or viral pollution. The large pore size of commonly available filter types means that microorganisms, such as bacteria, viruses and fungi, can easily pass through the filters and remain in the airflow of a building. These types of filters are only minimally effective, if that, for reduction or eradication of biological contaminants.

Electronic Air Cleaners (EACs) operate by using electrically charged filters to reduce airborne contaminants. As air passes through an HVAC system, the EAC uses a pre-filter to trap large particulates and an electrically charged filter to trap smaller particles. EACs have several limitations, such as the noise level during use, maintenance required to replace or wash filters to ensure the operation is adequate, electricity is required to operate them, and the limitations in the size of particles that can be eliminated.

An EAC system requires frequent cleaning of its electrostatic surface areas due to the collection of pollutants that adhere to the surfaces within the filter. Removing and cleaning of the filter by a qualified person increases the cost and the difficulty of completing the task. Routine maintenance processes requiring scheduling a service call can be easily overlooked. Furthermore, any apparatus that requires electricity to operate is subject to power fluctuations and power outages requiring maintenance to verify operation after each episode to ensure the equipment is operating as intended.

Ionic air cleaners operate by producing a stream of negatively charged ions that attract dust and other airborne particulates. The rationale for this is for the contaminants to be neutralized after being charged by ionization. These negatively charged particulates are attracted to positively charges surfaces, purportedly the collection plate in the ionizer, but too often the particulates adhere to other surfaces in the area, such as the floor or walls.

Typically, these ionic air cleaners do not have a fan to draw in air. Thus, ions are only emitted in the immediate vicinity of the device, and as such, are not capable of removing most air contaminants or pollution in the airstream. Ionization requires constant power usage to operate and effectiveness is lost sixty seconds after the particles have been ionized. Ionized air has to be constantly supplied with an airstream to pass the ionized particles to the occupied space. If the ionized air is being produced at the rooftop HVAC system of a large building, the ionized air would have to reach the area of operation within sixty seconds to have any effectiveness. Ionized air would have to pass through the ductwork, vents and shafts of several floors to reach the diffusers to enter the area of operation and then cover the entire area within sixty seconds, which makes this type of system ineffective in many cases.

Ozone generators are mainly used for deodorizing air by means of ozone reacting with some volatile compounds in the air. However, the ozone produced can cause more harm than good when ventilation is inadequate or the equipment is not properly maintained. Exposure to increased levels of ozone can cause a number of respiratory problems, including inflammation of lung tissue and decrease in lung function, and should only be used in unoccupied areas. Additionally, airborne contaminants or pollutants in the air are not removed by ozone generators.

Ultra-violet (UV) light used to kill biological contaminants, such as viruses and bacteria, has been extensively studied and operates effectively as long as it is used within its limitations. Ultra-violet light requires electrical usage to operate adding increased kilowatt usage to the electric demand. Ultra-violet light bulbs have a finite life span and require regular replacement of the bulbs. Qualified personnel are required to replace the lights and the replacement bulbs can be quite expensive. Ultra-violet light can be harmful to humans and care is required when the lights are in use. Additionally, if the central system in a large commercial building has a high rate of airflow past the UV lights, the UV light is less effective in killing biological contaminants and may result in little or no change to the biological pollutants in the air. As with ionized air, UV light does not remove pollutants or contaminants from the air, instead, contaminants are inactivated.

None of the above systems and techniques adequately solve the need to provide for more efficient, energy conservative, and effective air filtration, including very small particle air filtration. What is needed is a system and method for removal of airborne biological contaminants that is easily adaptable for operation in the air handling systems for various types of commercial and residential buildings.

SUMMARY OF THE INVENTION

The present invention improves air quality in a habitable environment over the prior art, and reduces air pollution and contaminants in the air to improve the health and welfare of living beings. The present invention can be used in air purification systems, whether stand alone or central/core systems to more efficiently and effectively remove particles or contact-kill certain airborne contaminants from the air in this environment. The present invention improves the air quality in living spaces and commercial use areas.

Disclosed herein is a filter assembly for air purification comprising: a supportive filter housing having a size and shape dimensioned to fit in a receiving space for an HVAC heating, ventilation and air conditioning system, said supportive filter housing having a frame with a plurality of side members, and said side members defining a first, second, third and fourth sides connected at a first, second, third and fourth corners and defining an open space in the middle of the four sides and four corners including a front and back open area for airflow, each of said members being U-shaped with a narrow lip extending into the front and back open areas. The filter assembly has a surface-enhanced copper filter configured for placement in the supportive filter housing to reside in said open space in the middle of the four sides and four corners, said surface enhanced copper filter having a first surface with dimensions on a first plane that extends in the open area between the plurality of side members and configured to be retained within its plurality of side members. The surface-enhanced copper filter is composed of a substantially pure solid elemental copper material on at least a portion of the first surface on the first plane of the surface-enhanced copper filter and the substantially pure copper fibrous copper material is arranged on the surface area of the surface-enhanced copper filter to activate surface area contact with airborne contaminants and support air purification using the solid elemental copper on the surface-enhanced copper filter.

The fibrous copper filter media of the disclosed filter assembly is a woven copper material, a non-woven copper material, a copper mesh material, a multi-layered copper mesh material or a plurality of copper quills. The woven copper material, non-woven copper material, copper mesh material and multi-layered copper mesh material have a plurality of pleats, contours or other shaping to increase the surface area for airflow across the copper material.

The filter housing of the disclosed filter assembly frame has top, bottom, left side and right side members. The filter housing frame members are plastic, polymer, expanded polymer or other suitable moldable material. The filter housing frame members are attached to one another by removable rivets in the frame's corners allowing the copper filter to be inserted or removed.

The filter housing has one or more mesh supports dimensioned to overlie the copper filter and be secured in the frame by one or more lip of one or more frame members, said supportive mesh having an open construction to maximize airflow through the open front and/or back airflow areas of the frame. The one or more mesh supports are wire, coated wire, plastic, polymer, or expanded polymer of sufficient strength to support the copper filter.

The plurality of copper quills of the filter assembly are densely arrayed and secured uniformly on a center rod support along the length and around the circumference of the center rod support forming one or more copper quill rods. The top and bottom members of the filter frame have a plurality of perforations, each perforation dimensioned to secure an end of one or more copper quill rods. A plurality of copper quill rods are positioned in the filter housing frame in one or more rows with each copper quill rod having a top end secured in a top member perforation and a bottom end secures in a bottom member perforation, and the copper quill rods are positioned such that a plurality of quills tips on one copper quill rod are touching a plurality of quills tips on one or more adjacent copper quill rod to optimize the copper contact surface area.

Disclosed herein is a method for purifying air with a surface-enhanced copper filter comprising the steps of: providing an air filter assembly configured for installation in an air ventilation system, said air filter assembly having an open air ventilation area and a surface-enhanced copper filter being composed of a substantially pure solid elemental copper material in at least a portion of the open air ventilation area; said surface-enhanced fibrous copper filter configured to contact biological contaminants and other pollutants in an airflow and said surface-enhanced fibrous copper media having anti-microbial and electrostatic properties capable of inactivating said biological contaminants and removing biological contaminants and other pollutants from the air; placing a filter housing in the filter assembly for holding the surface enhanced copper filter, said housing having a frame with top, bottom, left side and right side u-shaped members defining a perimeter of the filter assembly with a narrow lip edge on each member to secure the copper filter media in the frame; activating the ventilation system to create an air flow through the filter assembly, wherein the surface-enhanced copper filter removes biological contaminants and other pollutants from the air, inactivating said biological contaminants, and returning air to the environment after removes biological contaminants and other pollutants from the air, inactivating said biological contaminants.

In the disclosed method, the surface-enhanced copper filter is a woven copper material, a non-woven copper material, a copper mesh material, a multi-layered copper mesh material or a plurality of copper quills. The woven copper material, non-woven copper material, copper mesh material, or multi-layered copper mesh material has a plurality of pleats or contours to increase surface area for contact of the airflow to the fibrous copper filter material. The plurality of copper quills are densely arrayed and secured uniformly on a center rod support along the length and around the circumference of the center rod support forming one or more copper quill rods. The top and bottom members of the filter frame have a plurality of perforations, each perforation dimensioned to secure an end of one or more rods positioned in said filter housing frame.

The filter housing for the filter assembly of the disclosed method has one or more mesh supports dimensioned to overlie said copper filter and be secured in the frame by one or more lip of one or more frame members, the mesh supports being wire, coated wire, plastic, polymer, or expanded polymer of sufficient strength to support the copper filter and having an open construction to maximize airflow through the open front and/or back airflow areas of the frame.

Also disclosed is a mobile air purification system comprising: a cabinet having front panel, a right side panel, a left side panel, a back panel, a top panel and a floor panel, with each panel configured to create a box structure with an internal space, said cabinet having a removable door on the front panel and a plurality of locking casters coupled to said floor panel of said cabinet; said internal space of said cabinet having a control panel for operating the mobile system, a motor and fan, an air intake, a supply plenum, one or more louvers, and a filter housing having a first plane located internal to the filter housing; a power cord coupled to the control panel and motor to provide power to the system components; said cabinet housing having one or more pre-filters located near the air intake for removal of particulates from the air; and, one or more surface-enhanced copper filters located in the filter housing, and, the surface-enhanced copper filter located in the first plane of said filter housing and having a fibrous copper filter media composed of a substantially pure solid elemental copper material on at least a portion of the first plane of said filter housing; said surface-enhanced copper filter configured to contact biological contaminants and other pollutants in an airflow, said fibrous copper media having anti-microbial and electrostatic properties capable of inactivating said biological contaminants and removing biological contaminants and other pollutants from the air.

The filter housing has a frame with top, bottom, left side and right side u-shaped members defining a perimeter of the filter assembly with a narrow lip edge on each member to secure the copper filter media in the frame.

The surface-enhanced copper filter in the filter housing is a woven copper material, a non-woven copper material, a copper mesh material, or a multi-layered copper mesh material, and the surface-enhanced copper filter has a plurality of pleats or contours to increase surface area for contact of the airflow to the fibrous copper filter material. The surface-enhanced copper filter is secured in said filter housing with one or more mesh supports dimensioned to overlie said copper filter and be secured in the frame by one or more lip of one or more frame members. The supportive mesh is wire, coated wire, plastic, polymer, or expanded polymer of sufficient strength to support the copper filter and having an open construction to maximize airflow through the open front and/or back airflow areas of the frame.

The plurality of copper quills of the surface-enhanced copper filter are densely arrayed and secured uniformly on a center rod support along the length and around the circumference of said center rod support forming one or more copper quill rods. The copper quill rods being positioned in said filter housing frame in one or more rows with each copper quill rod having a top end secured in a top member perforation and a bottom end secured in a bottom member perforation, and the copper quill rods are positioned such that a plurality of quills tips on one copper quill rod are touching a plurality of quills tips on one or more adjacent copper quill rod to optimize the copper contact surface area.

BRIEF DESCRIPTION OF THE DRAWINGS

The above, and other objects and advantages of the present invention will be understood upon consideration of the following detailed description taken in conjunction with the accompanying drawings, in which like reference characters refer to like parts throughout, and in which.

DETAILED DESCRIPTION

Disclosed herein is a filter assembly and surface-enhanced copper filter for air purification and a system and method for using the filter assembly and surface-enhanced copper filter for air purification. The disclosed surface-enhanced copper filter assembly has a filter component of fibrous copper material contained within a filter housing. The filter housing has an open framework that defines the dimensions (height, width and depth) of the filter assembly and a supportive network across the open airflow areas of the frame that provides stability for the copper filter within the frame. The filter housing also serves as a mounting surface for the filter assembly within an air handling system.

Copper Filter Media

The filter media for the disclosed invention is a substantially pure copper fibrous material. The fibrous copper material can be configured as a woven or non-woven copper material, a copper mesh material, a multi-layered copper mesh material, or as fibrous copper quills. The filter assembly has a directional flow path to direct the air through the fibrous copper material for maximum contact with the copper. By using solid elemental copper (substantially pure) for the fibrous copper material, the highest value of stored static electrons can be achieved for on-contact killing of airborne biological contaminants and entrapment of other airborne particulates. Using substantially pure copper, unadulterated by polymers or coatings, allows the natural antimicrobial properties of copper to yield the most effective eradication of biological contaminants from the air.

Substantially pure is copper used in the filter media that is up to 100% pure copper by weight and/or by volume, but can also include copper materials that have an insignificant amount of impurities or foreign materials (making the substantially pure copper composed of between 85% to 99.9% elemental copper by weight and by volume). The substantially pure copper material need only occupy some of the filter media, and the filter media need not be composed entirely of the substantially pure copper in order to achieve the benefits of the claimed invention. By using the substantially pure copper filter media, the invention is estimated to achieve more effective particulate capture, including approximately 15% to 50% more effective particulate capture by volume than the prior art systems and methods described in the background of the invention. Additionally, by using the substantially pure copper filter media, the invention is also estimated to capture 25% to 75% smaller sized particulates than the prior art systems and methods described in the background of the invention; and, the invention is also estimated to achieve these benefits of greater particulate capture and smaller sized particulate capture with 15% to 65% less energy consumption (more energy efficient) than the prior art systems and methods described in the background of the invention.

As air passes through the open areas of the filter assembly, the copper fibrous material will catch and contain a measurable number of the biological contaminants and air pollutants passing through the filter material. The natural copper element of the fibrous filter material acts as a electrostatic surface and is capable of killing biological contaminants on contact while removing these biological contaminants and other pollutants from the air.

The copper filter media will be of a thickness to offer the highest efficiency necessary for offering the longest life expectancy possible and the highest integrity of leak passage rate net zero. The filter assembly may have a thickness of 0.5 inch to 6 inches. Preferably, the filter assembly has a thickness of 1-4 inches. The fibrous copper filter material may be of woven or non-woven copper material, copper mesh material, multi-layered copper mesh material or copper quills. The fibrous copper filter material as used in the filter assembly may be pleated with a plurality of pleats to increase surface area for contact of airborne contaminants. The fibrous copper filter material used in the filter assembly may also be copper quills densely arranged along a tubular structure.

Filter Housing

The filter housing has a framework of solid or perforated members defining the perimeter of the filter assembly with the front and back areas being open to airflow. The front and back airflow areas may be overlaid with a supportive network to hold the fibrous copper filter material positioned within the filter housing while allowing air to flow through the filter assembly and contact the copper fibrous material therein. In some embodiments, such as a filter assembly utilizing copper quills, a supportive network is not needed.

The filter assembly housing has a framework of molded plastic, polymer, expanded polymer, or other moldable material which is constructed to withstand the weight and rigid posture of the copper filter media within the frame. The frame is constructed in a manner to be assembled and disassembled via plastic rivets embossed in the frame's corners, which allows the filter material to be inserted into or removed from the filter housing. The frame's height and width dimension will be as required to accommodate industry standard sizes, especially for square or rectangular filter configurations. Open front and back areas of the frame allow airflow through the filter assembly. The frame depth will be as required to accommodate industry standard sizes, most commonly one inch, two inches, or four inches in thickness. The frame shape, height, width and depth can also be custom fitted for specialized applications.

The filter housing also incorporates a supportive network across the open front and back airflow areas of the frame with the size of the supportive network defined by the height and width of the frame. The supportive network may be of wire, coated wire, plastic, polymer, or expanded polymer having the structural strength to support the copper filter material in the frame. Preferably, the supportive network is wire mesh coated in a plastic or polymer material to prevent oxidation of dissimilar metals where the support contacts the filter material. The mesh support is molded to the dimensions equivalent to the open front and back airflow areas of filter housing frame. The coated wire mesh supports the copper filter media enclosed within the filter housing. The coated wire mesh support has an open construction with openings sized to facilitate maximum airflow though the filter assembly while providing the required support for the copper filter.

The disclosed surface-enhanced copper filter assembly may be sized to industry standards for installing in stationary or mobile HVAC or air purification units with the frame sized to accommodate industry standard sizing to the tightest tolerance. Since most industry standard sizes for filters are square or rectangular, the disclosed filter assembly is preferably square or rectangular. Optionally, the filter assembly may be made in custom sizes and shapes for specific applications with equivalent filtration efficacy. Brackets known in the HVAC industry, such as C-Channel brackets, can be used as a base support and flashing to prevent air from bypassing the filter when installed in the cabinet of commercial or residential HVAC equipment or in a mobile air purification unit. Precise fitting of the frame to the unit will be achieved by using truest measurement of frame tolerance.

The filter assembly is directional to facilitate air entering on the correct side of the filter assembly to contact the copper filter material for maximum on-contact inactivation and entrapment of biological contaminants. The filter can be removed from the filter housing and cleaned without minimizing the integrity of the copper filter material to increase life of the filter assembly. The filter assembly is installed like standard filters in the industry, and the filter assembly not required to be permanently installed in the system. The filter assembly can be disassembled to allow recycling of the core material of the copper filter after life expectancy of the filter assembly is expended.

Figure 1:
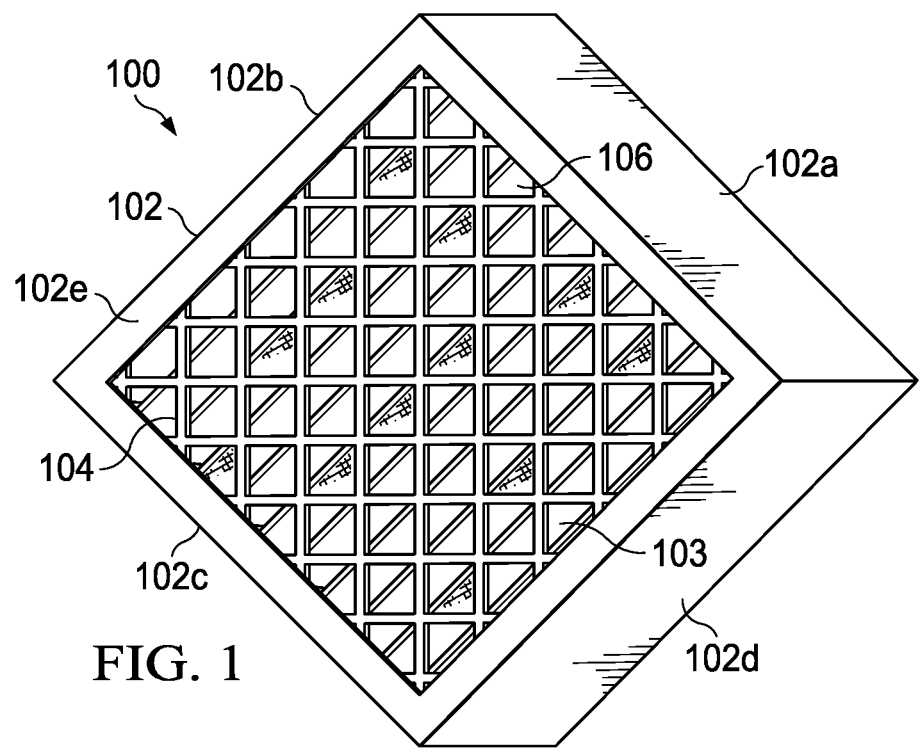
FIG. 1 shows one embodiment of a copper filter for an air purification system.

In the embodiment of FIG. 1, a filter assembly 100 is shown having woven or non-woven fibrous copper filter material 106 situated within the frame of a filter housing 102. The filter housing frame 102 has top, bottom, right side, and left side members 102a-102d defining the boundaries of the filter assembly 100 constituting the height, width, and depth of the filter assembly. The filter frame has a narrow lip 102e on the long edge of each member that extends narrowly into the open areas on the front and back sides, such that each frame member is essentially U-shaped. Supportive mesh 104 is substantially the same height and width as the frame housing 102 and is positioned adjacent to the copper filter 106 in the frame 102. The frame lip 102e secures the filter material 106 and the supportive mesh 104 within the bounds of the frame 102. The frame lip 102e is seen on the front open area 103 in FIG. 1 and a similar lip is situated similarly on the open back area (not shown). The back side of the filter assembly 100 is substantially the same as the front side seen in FIG. 1 having the same dimensions to the frame 102, frame members 102a-102d, frame lip 102e, open area 103, and supportive mesh 104 adjacent the copper filter 106.

The frame members 102a-102d provide a framework around the fibrous copper filter material 106 having an open area 103 in the front and back of the housing that constitute the airflow path through the filter assembly 100. The frame lip 102e directs airflow away from the ends of the filter material and toward the open front area 103 so the airflow can contact the copper filtration surface 106 as it passes through the filter assembly. Supportive mesh 104 overlies the fibrous copper filter material 106 supporting the filter in the housing frame 102 and preventing deformation of the filter from airflow though the filter assembly 100. The edges of the supportive mesh 104 are secured between the filter material 106 and frame lip 102e. The fibrous copper filter material has a plurality of pleats with the pleats being substantially the width of and housed within the filter assembly 100. Pleats may be oriented vertically or horizontally.

Figure 1A:
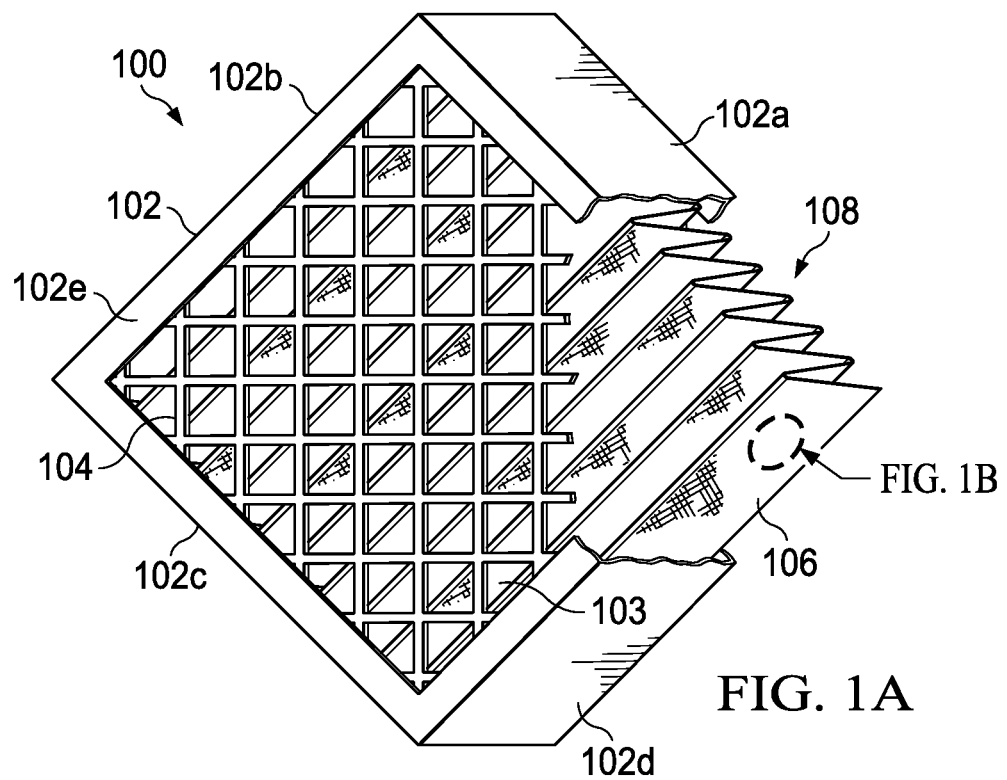
FIG. 1A shows a cut-away view of the copper filter.

FIG. 1A is a cut-way view of a portion of the filter housing 100 in FIG. 1. As shown in FIG. 1A, the fibrous copper filter material 106 has a pleated configuration 108 with a plurality of pleats. The edges of the filter material are dimensioned to meet the interior surface of the frame members 102a-102d and the frame lip 102e to be secured in the housing 102 along with the supportive mesh 104. The pleating 108 of the fibrous copper filter material 106 yields an increased surface area for airflow to contact the copper filter for inactivation of biological contaminants and removal of the biological contaminants and other pollutants from the air.

Figure 1B:
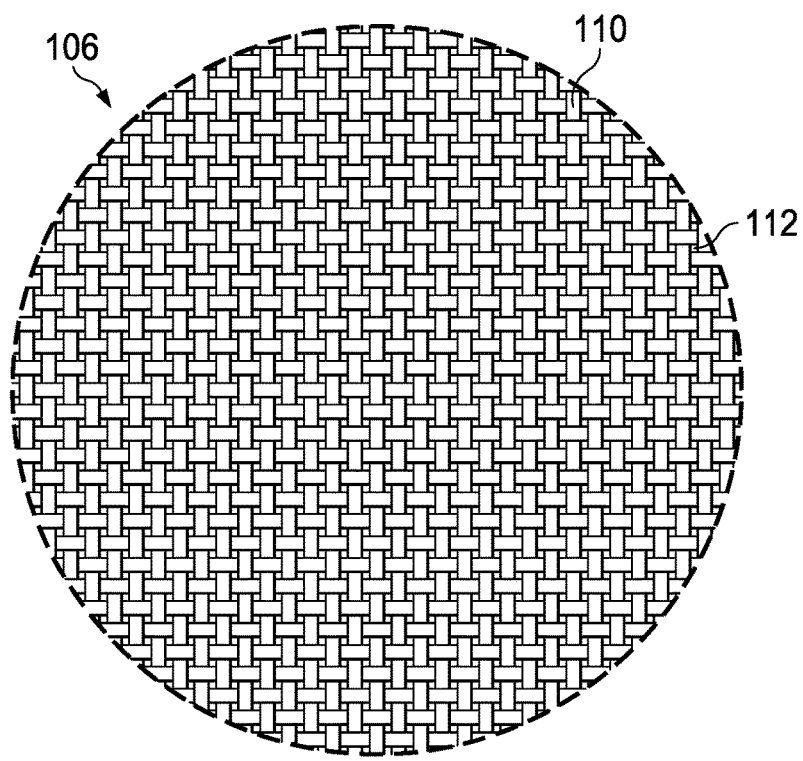
FIG. 1B shows an enlargement of the copper filter material used therein.

FIG. 1B shows an enlargement of the fibrous copper filter material seen in FIGS. 1 and 1A. The overlapping copper fibers 110 are seen with pore spaces 112 between the fibers. Air directed through the filter assembly flows through the pore spaces 112 contacting the copper fibers 110 as it flows through the assembly. Because the fibers are substantially pure copper, all surfaces of the fibers will have the antimicrobial and electrostatic properties of copper to kill biological contaminants while trapping the biological contaminants and other pollutants in the filter material.

Substantially pure is copper used in the filter media shown in FIGS. 1A and 1B, which is composed of up to 100% pure copper by weight and/or by volume, but can also include copper materials that have an insignificant amount of impurities or foreign materials (making the substantially pure copper composed of between 85% to 99.9% elemental copper by weight and by volume). The substantially pure copper material need only occupy some of the filter media, and the filter media need not be composed entirely of the substantially pure copper in order to achieve the benefits of the claimed invention. By using the substantially pure copper filter media, the invention is estimated to achieve more effective particulate capture, including approximately 15% to 50% more effective particulate capture by volume than the prior art systems and methods described in the background of the invention. Additionally, by using the substantially pure copper filter media, the invention is also estimated to capture 25% to 75% smaller sized particulates than the prior art systems and methods described in the background of the invention; and, the invention is also estimated to achieve these benefits of greater particulate capture and smaller sized particulate capture with 15% to 65% less energy consumption (more energy efficient) than the prior art systems and methods described in the background of the invention.

Figure 2:
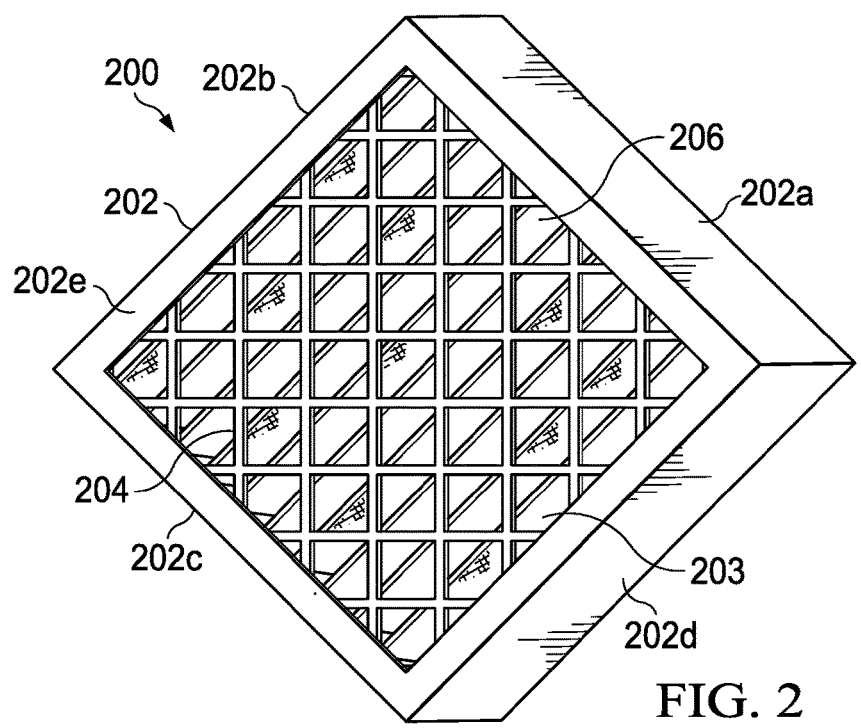
FIG. 2 shows a second embodiment of a copper filter for an air purification system.

In the embodiment of FIG. 2, a filter assembly 200 is shown having a mesh fibrous copper filter material 206 situated within the frame of a filter housing 202. The filter housing frame 202 has top, bottom, right side, and left side members 202a-202d defining the boundaries of the filter assembly 200 constituting the height, width, and depth of the filter assembly 200. The filter frame 202 has a narrow lip 202e on the long edge of each member that extends narrowly into the open areas on the front and back sides such that each frame member is essentially U-shaped. Supportive mesh 204 is substantially the same height and width as the frame housing 202 and is positioned adjacent to the copper filter 206 in the frame 202. The frame lip 202e secures the filter material 206 and the supportive mesh 204 within the bounds of frame 202. The frame lip 202e is seen on the front open area 203 in FIG. 2 and a similar lip is situated similarly on the open back area (not shown). The back side of the filter assembly 200 is substantially the same as the front side seen in FIG. 2 having the same dimensions to the frame 202, frame members 202a-202d, frame lip 202e, open area 203, and supportive mesh 204 adjacent the copper filter 206.

The frame members 202a-202d provide a framework around the fibrous copper filter material 206 having an open area 203 in the front and back of the housing that constitute the airflow path through the filter assembly 200. The frame lip 202e directs airflow away from the ends of the filter material and toward the open front area 203 so the airflow can contact the copper filtration surface 206 as it passes through the filter assembly. Supportive mesh 204 overlies the fibrous copper filter material 206 supporting the filter in the housing frame 202 and preventing deformation of the filter from airflow though the filter assembly 200. The edges of the supportive mesh 204 are secured between the filter material 206 and frame lip 202e. The fibrous copper filter material 206 is a multi-layered mesh having a plurality of pleats with the pleats being substantially the width of and housed within the filter assembly 200. Pleats may be oriented vertically or horizontally.

Figure 2A:
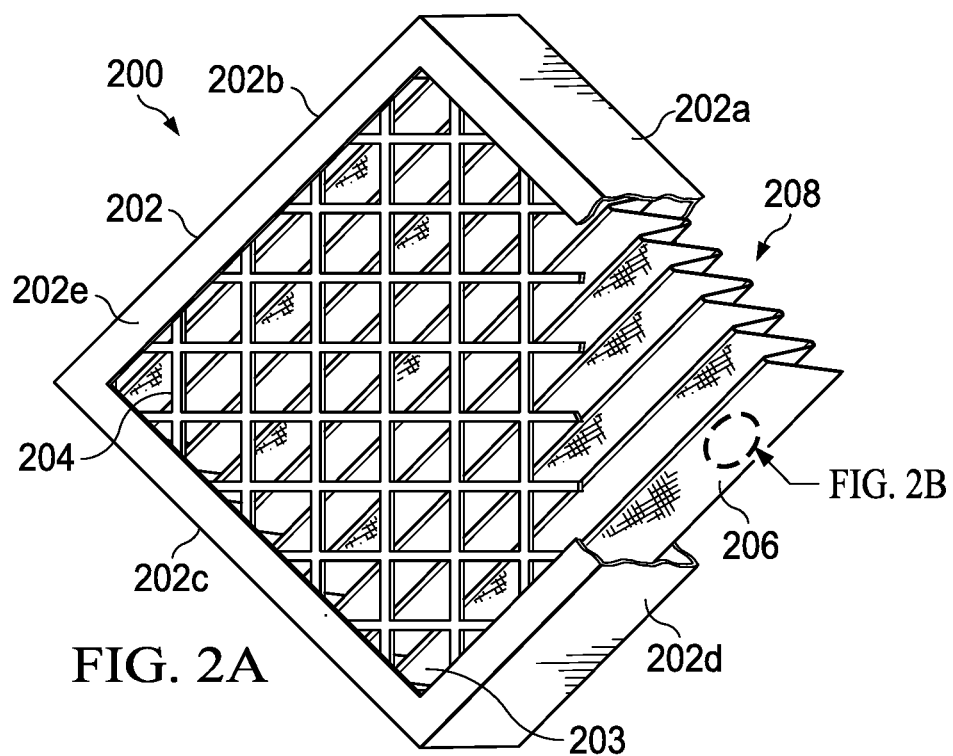
FIG. 2A shows a cut-away view of the copper filter

FIG. 2A is a cut-way view of a portion of the filter housing 200 in FIG. 2. As shown in FIG. 2A, the fibrous copper filter material 206 is a multi-layered mesh having a pleated configuration 208 with a plurality of pleats. The edges of the filter material are dimensioned to meet the interior surface of the frame members 202a-202d and the frame lip 202e to be secured in the housing 202. The pleating 208 of the fibrous copper filter material 206 yields an increased surface area for airflow to contact the copper filter for inactivation of biological contaminants and removal of the biological contaminants and other pollutants from the air. The multi-layered configuration for the fibrous copper mesh also increases the surface area available for airflow to contact the copper fibers as it passes through the filter.

Figure 2B:
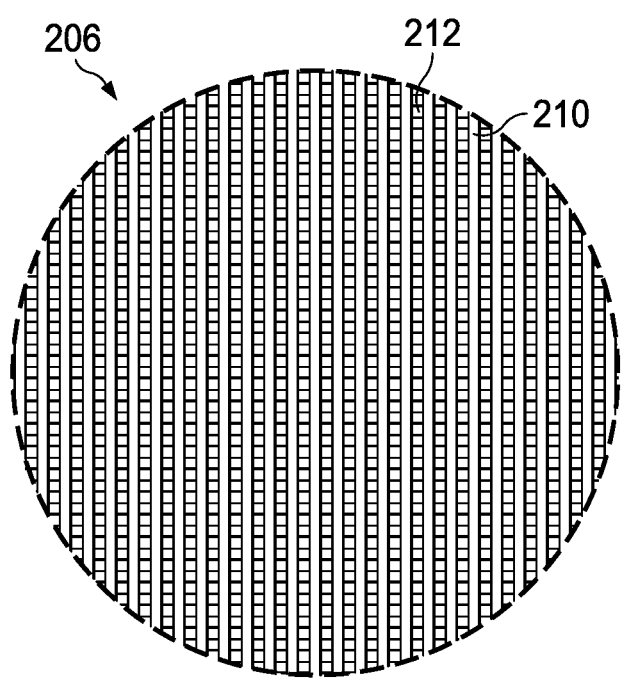
FIG. 2B shows an enlargement of the copper filter material used therein.

FIG. 2B shows an enlargement of the fibrous copper filter material seen in FIGS. 2 and 2A. The overlapping copper fibers 210 are seen with pore spaces 212 between the fibers. Air directed through the filter assembly flows through the pore spaces 212 contacting the copper fibers 210 as it flows through. Because the fibers are substantially pure copper, all surfaces of the fibers will have the antimicrobial and electrostatic properties of copper to kill biological contaminants while trapping the biological contaminants and other pollutants in the filter material.

Substantially pure is copper used in the filter media shown in FIGS. 2, 2A and 2B, which is composed of up to 100% pure copper by weight and/or by volume, but can also include copper materials that have an insignificant amount of impurities or foreign materials (making the substantially pure copper composed of between 85% to 99.9% elemental copper by weight and by volume). The substantially pure copper material need only occupy some of the filter media, and the filter media need not be composed entirely of the substantially pure copper in order to achieve the benefits of the claimed invention. By using the substantially pure copper filter media, the invention is estimated to achieve more effective particulate capture, including approximately 15% to 50% more effective particulate capture by volume than the prior art systems and methods described in the background of the invention. Additionally, by using the substantially pure copper filter media, the invention is also estimated to capture 25% to 75% smaller sized particulates than the prior art systems and methods described in the background of the invention; and, the invention is also estimated to achieve these benefits of greater particulate capture and smaller sized particulate capture with 15% to 65% less energy consumption (more energy efficient) than the prior art systems and methods described in the background of the invention.

Figure 3:
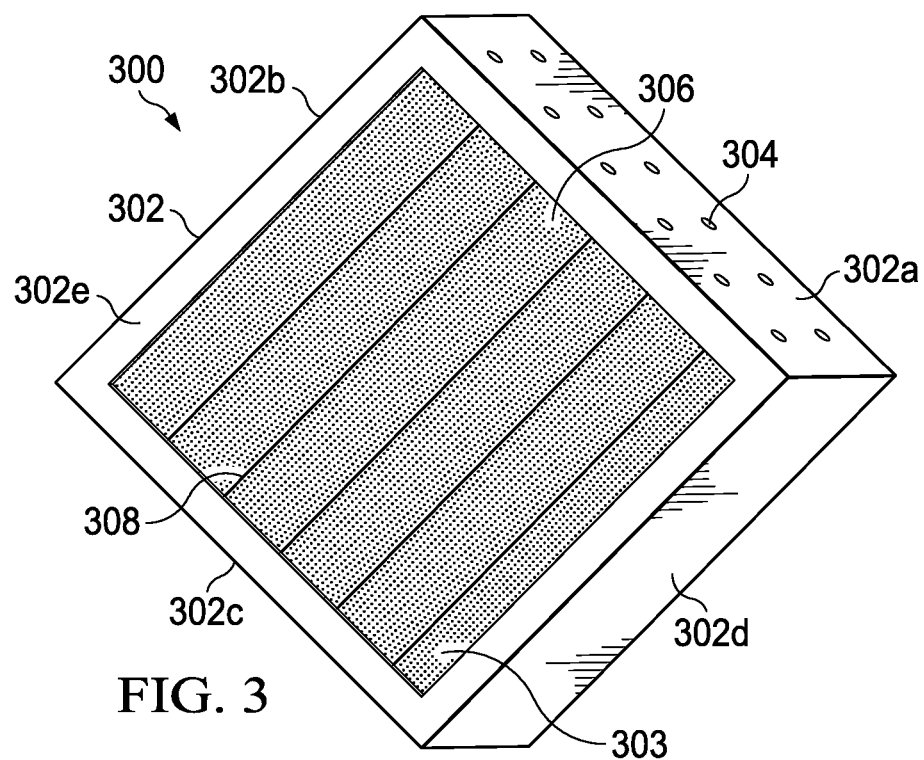
FIG. 3 shows another embodiment of a copper filter for an air purification system.

In the embodiment of FIG. 3, a filter assembly 300 is shown having a copper quill filter material 306 situated within the frame of a filter housing 302. The filter housing frame 302 has top, bottom, right side, and left side members 302a-302d defining the boundaries of the filter assembly 300 constituting the height, width, and depth of the filter assembly. Frame members 302a and 302c have a plurality of perforations 304 dimensioned to accommodate center rod supports for the copper quill filter material 306. The filter frame has a narrow lip 302e on the long edge of each member that extends narrowly into the open areas 303 on the front and back sides such that each frame member is essentially U-shaped. The frame lip 302e secures copper quill-covered rods 308 having the copper quill filter material 306 within the bounds of frame 302. The frame lip 302e is seen on the front open area 303 in FIG. 3 and a similar lip is situated similarly on the open back area (not shown). The back side of the filter assembly 300 is substantially the same as the front side seen in FIG. 3 having the same dimensions to the frame 302, frame members 302a-302d, frame lip 302e, open area 303, and copper quill-covered rods 308 with fibrous copper quill filter material 306.

Figure 3A:
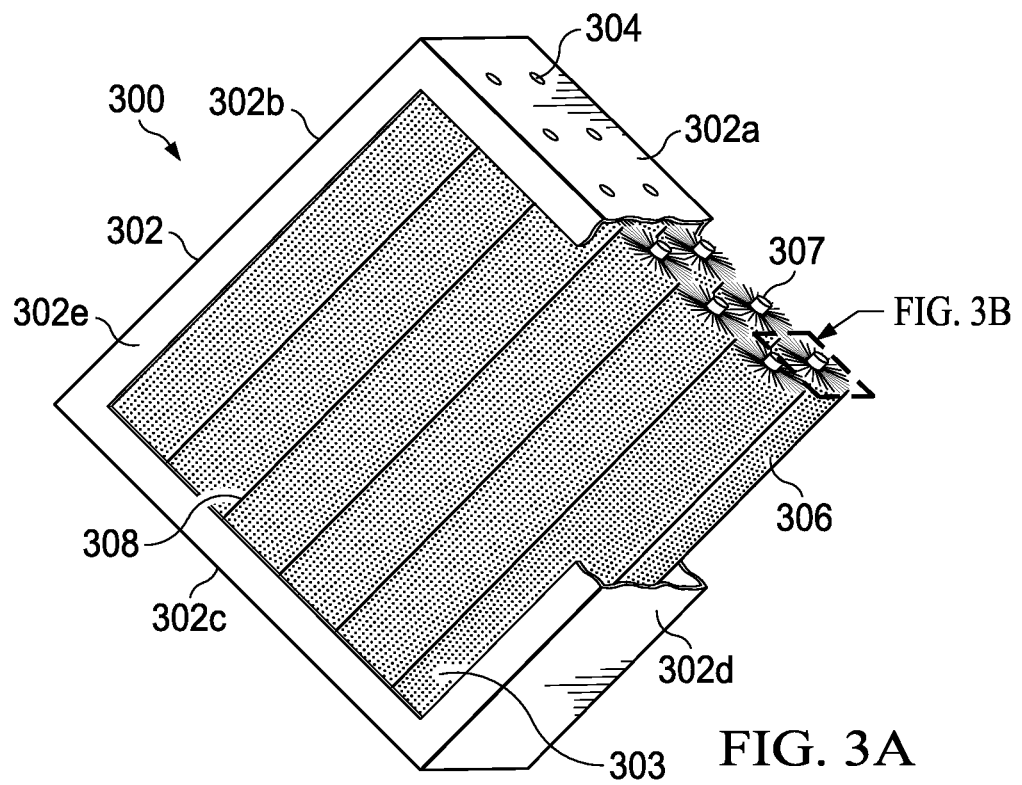
FIG. 3A shows a cut-away view of the copper filter.

FIG. 3A is a cut-way view of a portion of the filter housing 300 in FIG. 3. As shown in FIG. 3A, the copper quill-covered rods 308 have fibrous copper quills 306 secured to center rod supports 307 with the copper quills densely distributed in a uniform manner around and along the length of the center support rods 307. Small end sections at the top and bottom of the support rod 307 are fabricated without quills to securely fit in the perforations 304 on the frame members. A plurality of copper quill-covered rods 308 with center rod supports 307 with the fibrous copper quills 306 are positioned in the filter housing frame 302 such that the ends of the center support rods 307 are secured within the perforations 304 on frame members 302a and 302c. The plurality of copper quill-covered rods 308 are positioned within the frame such that the tips of the quills for one copper quill-covered rod will touch the tips of the quills on adjacent rods yielding an airflow path with continuous copper contact through the copper quill filter media.

The diameter of the copper quill-covered rods 308 with center rod supports 307 and attached fibrous copper quill material 306 is such that the configuration of copper quill-covered rods 308 is substantially the same as the depth as the housing frame 302 such that the quills touch the interior surface of the frame lip 302e of frame members 302a-302d maintaining substantially the same diameter across the length of the rods within the housing so that the copper quill filter material does not extend beyond the plane of the frame lip 302e across the expanse of the open areas 303 in front and back of the filter assembly. The length of the center rod supports 307 with the fibrous copper quills 306 is such that the copper quill filter material contacts the inside surfaces of frame members 302a and 302c and the rod ends extend through the perforations 304 and are level with the outside surface of members 302a and 302c. Alternatively, frame members 302a and 302c have a plurality of divots on the interior surface of the members that secure the ends of the center support rods 307 in the same positions as the perforations 304 with the copper quills contacting the inside of frame members 302a and 302c, but the rod ends do not pass through to the outside surface of the frame members, yielding an entire surface for the exterior of the frame members.

The copper quill filter material 306 being densely distributed across the length and width of the copper quill-covered rods 308 along with the copper quill-covered rods being closely adjacent with quill tips from adjacent rods touching one another within the filter assembly 300 yields an increased surface area for airflow to contact the copper for inactivation of biological contaminants and for removal of the biological contaminants and other pollutants from the air. The size and number of copper quill-covered rods 308 positioned within the filter frame 302 and the diameter of those copper quill-covered rods will vary according the height, width and depth of the filter assembly. Filter frames can have varying depths and deeper frames may need more rows of copper quill-covered rods than shown in FIGS. 3 and 3A. Filter assemblies can have varying widths and wider frames will necessarily have more copper quill-covered rods than narrower filter frames. The number of copper quill-covered rods shown in this embodiment is representative only and is not meant to be limiting of the number of rods that can be used in the filter assembly.

Figure 3B:
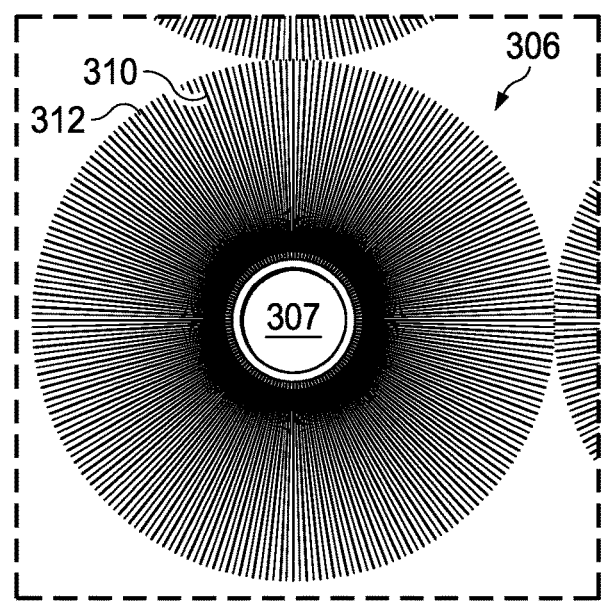
FIG. 3B shows an enlargement of the copper filter material used therein.

FIG. 3B shows an enlargement of the copper quill-covered rods 308 with the fibrous copper quill filter material 306 and the center rod support 307 seen in FIGS. 3 and 3A. The copper fiber quills 310 are shown with narrow air spaces 312 between the quills wherein the quills 310 are closely adjacent to one another at the center rod support 307 and the quills 110 fan out slightly at the periphery of the copper quill-covered rod 308 to provide air spaces 312 for air to flow through the filter assembly 300 while still providing adequate contact of contaminants with the copper quills 110. Air directed through the filter assembly 300 flows through the air spaces 312 contacting the copper fiber quills 310 as it flows through. Because the quills are substantially pure copper, all surfaces of the quills will have the antimicrobial and electrostatic properties of copper to kill biological contaminants while trapping the biological contaminants and other pollutants in the filter material.

Substantially pure is copper used in the filter media shown in FIGS. 3, 3A and 3B, which is composed of up to 100% pure copper by weight and/or by volume, but can also include copper materials that have an insignificant amount of impurities or foreign materials (making the substantially pure copper composed of between 85% to 99.9% elemental copper by weight and by volume). The substantially pure copper material need only occupy some of the filter media, and the filter media need not be composed entirely of the substantially pure copper in order to achieve the benefits of the claimed invention. By using the substantially pure copper filter media, the invention is estimated to achieve more effective particulate capture, including approximately 15% to 50% more effective particulate capture by volume than the prior art systems and methods described in the background of the invention. Additionally, by using the substantially pure copper filter media, the invention is also estimated to capture 25% to 75% smaller sized particulates than the prior art systems and methods described in the background of the invention; and, the invention is also estimated to achieve these benefits of greater particulate capture and smaller sized particulate capture with 15% to 65% less energy consumption (more energy efficient) than the prior art systems and methods described in the background of the invention.

For all the filters shown in FIGS. 1, 1A, 1B, 2, 2A, 2B, 3, 3A, and 3B, as air passes through the open sides of the filter assembly of any of the embodiments, the copper fibrous material will catch and contain a measurable number of biological contaminants and air pollutants that pass through the filter material. The natural copper element of the fibrous filter material acts as a electrostatic surface capable of killing biological contaminants on-contact while removing these biological contaminants and other pollutants from the air.

The filter assembly has a directional flow path to direct the air through the fibrous copper material for maximum contact with the copper. By using solid elemental copper for the fibrous copper material, the highest value of stored static electrons can be achieved for on-contact killing of airborne biological contaminants and entrapment of other airborne particulates. By using a substantially pure form of copper, unadulterated by polymers or coatings, the natural properties of copper will have the most effective eradication of contaminants.

The copper filter assembly with the copper fibrous material is to be placed in the HVAC or air purification unit after a pre-filter to remove large particulate from the airstream prior to encountering the fibrous copper filter material. The surface of the copper fibrous material must be capable of containing airborne contaminants long enough for the contact-kill process to occur. This filter assembly, as with all filters in HVAC or air purification systems, will be most effective if the leak rate of air within the unit is at a minimal leak rate in the system. If air by-passes the vicinity of the unit that houses the filters, pollutants and contaminants in the air will not efficiently contact the filter leading to unfiltered air being recirculated to the building.

For the filter assembly housing for the disclosed embodiments, a molded frame of plastic, polymer, expanded polymer or other moldable material is constructed to withstand the weight and rigid posture of the copper filter media within the frame. The filter media can be pleated copper material or copper quills. The frame is constructed to be assembled and disassembled via plastic rivets embossed in the frame's corners allowing the filter media to be easily placed in or removed from the frame. The frame height and width dimensions will be as required to accommodate industry standard sizes, especially for square or rectangular filter configurations. The frame thickness will be as required to accommodate industry standard sizes, and are most commonly one inch, two inch or four inches in thickness, but may be made in custom shapes and/or sizes to accommodate specific needs.

The frames of filter assemblies with pleated fibrous copper filter material incorporate a coated wire mesh support across the open front and back areas defined by the height and width of the frame. This wire mesh support will be molded to size and coated in a plastic or polymer material equivalent to the material of the frame housing to prevent oxidation of dissimilar metals from occurring. The coated wire mesh support has an open construction to facilitate airflow though the filter, similar to that of chicken wire or wide mesh hardware cloth. The coated wire mesh support adds additional support to the copper filter media enclosed within the filter assembly housing.

The surface-enhanced copper filter disclosed herein can be utilized in a mobile air purification system. A mobile air purification system may have a cabinet constructed of plastic, aluminum, sheet metal, or combinations thereof, with louvers near the top on all sides for passage of air with variable dimensions. An exemplary unit would be around 36-60 inches high with a width of 16-24 inches and a depth of 16-33 inches, and have a removable door for access to interior components. The unit may be insulated with foam, fiberglass, or other suitable insulating material. The cabinet may have a control panel having a controller, such as a Programmable Logic Controller (PLC), Unitary Control Module (CM), Peripheral Interface Controller (PIC) or a similar electronic interface; an Electronically Commutated Motor (ECM) motor and fan; locking casters or stationary foot pegs; and a power cord. The cabinet encompassing these features can be square, rectangular or octagonal in shape.

The mobile air purification system uses at least one pre-filter, such as a Minimum Efficiency Reporting Value (MERV) 10-13 filter, and one or more of the disclosed surface-enhanced copper filter assemblies.

Figure 4:
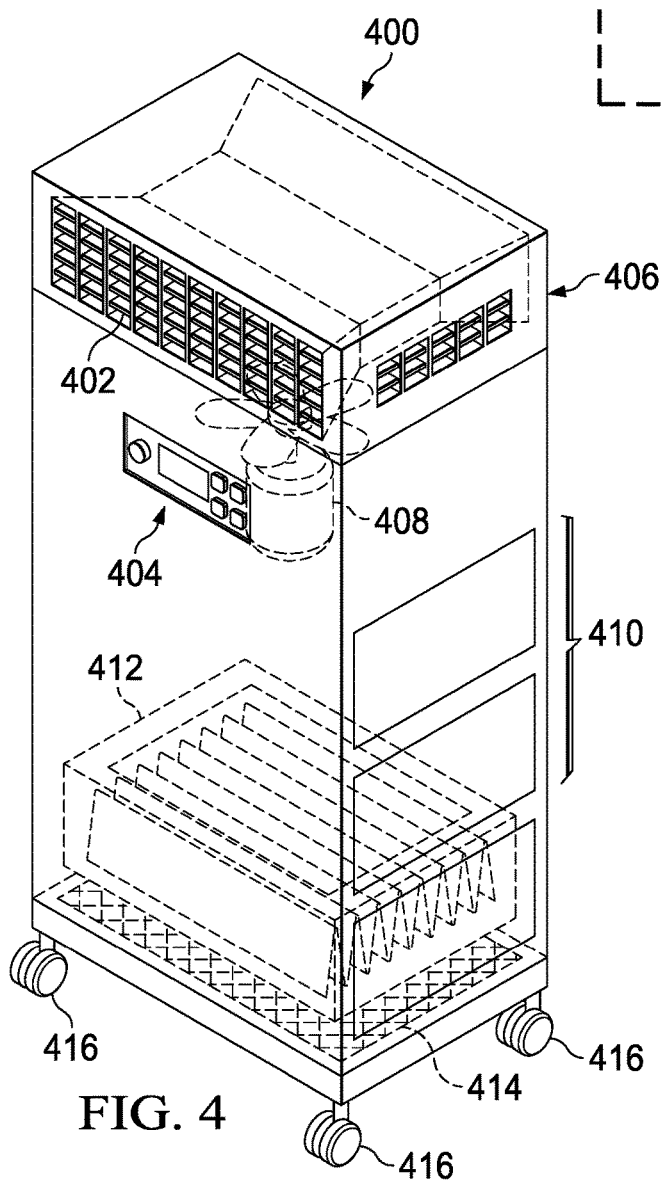
FIG. 4 shows a mobile air purification unit.

An exemplary mobile air purification unit is shown in FIG. 4. The mobile air purification unit is a cabinet 400 with locking castors 416. Optionally, the unit may have stationary feet. One or more pre-filter 414 removes particulates from the air. Air is then directed through one or more of the disclosed surface-enhanced copper filters 412 made of substantially pure copper media. The center section 410 of the cabinet has space to accommodate additional filters of different types, if desired. A motor and fan 408 powers the unit and draws air into the system and through the pre-filter 414 and surface-enhanced copper filter 412. Purified air is returned to the room via vents 402 located on one or more sides of the unit as situated adjacent to the supply plenum 406. The unit has a controller 404 for operation of the unit.

Substantially pure is copper used in the filter media shown in FIGS. 1A and 1B, which is composed of up to 100% pure copper by weight and/or by volume, but can also include copper materials that have an insignificant amount of impurities or foreign materials (making the substantially pure copper composed of between 85% to 99.9% elemental copper by weight and by volume). The substantially pure copper material need only occupy some of the filter media, and the filter media need not be composed entirely of the substantially pure copper in order to achieve the benefits of the claimed invention.

Operational steps of the system include: Air is drawn into the cabinet from the surrounding environment using a fan and Electronically Commutated Motor (ECM). The air passes through a MERV-type pre-filter to remove particulates. The air then flows through one or more of the disclosed surface-enhanced copper filters for inactivation of biological contaminants and removal of the contaminants and other pollutants, and the purified air is returned to the environment outside of the cabinet.

Additional filters and/or purification means may optionally be included in the mobile air purification cabinet including: High-Efficiency Particulate Air (HEPA) filter; and additional particulate or electrostatic filters. Optionally, the mobile air purification system may utilize non-filter purification means inside the cabinet in addition to the disclosed surface-enhanced copper filter, such as: Ultra-violet (UV-C) lights and/or ionizers.

The additional optional filters and/or non-filter purification means can be positioned before or after one or more of the surface-enhanced copper filters if other means of purifying the air are desired in addition to the surface-enhanced copper filter.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention; and, in fact, while the invention has been described, disclosed, illustrated and shown in various terms of certain embodiments or modifications which it has presumed in practice, the scope of the invention is not intended to be, nor should it be deemed to be, limited thereby, and such other modifications or embodiments as may be suggested by the teachings herein are particularly reserved, especially as they fall within the breadth and scope of the claims here appended.

The invention claimed is:

1. A filter assembly for air purification comprising:
    a supportive filter housing having a size and shape dimensioned to fit in a receiving space for an HVAC heating, ventilation and air conditioning system, said supportive filter housing having a frame with a plurality of side members, and said side members defining a first, second, third and fourth sides connected at a first, second, third and fourth corners and defining an open space in the middle of the four sides and four corners including a front and back open area for airflow, each of said members being U-shaped with a narrow lip extending into the front and back open areas;
    a surface-enhanced copper filter configured for placement in the supportive filter housing to reside in said open space in the middle of the four sides and four corners of said supportive filter housing, said surface-enhanced copper filter having a first surface with dimensions on a first plane that extends in the open area between the plurality of side members of said supportive filter housing and configured to be retained within its plurality of side members of said supportive filter housing; and,
    one or more copper quills having quill surface extensions coated with a substantially pure solid elemental copper material; said one or more copper quills being placed said open space in the middle of the supportive filter housing to promote contact with airborne contaminants and support air purification.

2. The filter assembly of claim 1, wherein surface-enhanced copper filter includes a plurality of copper quills.

3. The filter assembly of claim 1, wherein said supportive filter housing frame has top, bottom, left side and right side members.

4. The filter assembly of claim 3, wherein said members of the supportive filter housing frame are made of plastic, polymer, or expanded polymer.

5. The filter assembly of claim 3, wherein said members of the supportive filter housing frame are attached to one another by removable rivets.

6. The filter assembly of claim 1, wherein the quill surface extensions of the one or more copper quills allow for airflow across the substantially pure solid elemental copper material coated on said quill surface extensions.

7. The filter assembly of claim 1, wherein said filter housing further comprises one or more mesh supports dimensioned to overlie said surface-enhanced copper filter and be secured to in the frame by one or more frame members.

8. The filter assembly of claim 7, wherein said one or more mesh supports are made of wire, coated wire, plastic, polymer, or expanded polymer.

9. The filter assembly of claim 2, wherein at least one of said one or more of copper quills are mounted to a quill rod secured in the open space of the surface-enhanced copper filter frame.

10. The filter assembly of claim 9, wherein said supportive filter housing frame has one or more perforations that are used to secure an end of one or more quill rods.

11. The filter assembly of claim 9, wherein there is a plurality of copper quill rods positioned in said open space of said supportive filter housing frame.

12. A method for purifying air comprising the steps of:
    providing an air filter assembly configured for installation in an air ventilation system, said air filter assembly having a filter housing surrounding a surface-enhanced copper filter configured with a plurality of pleated woven filter materials and at least one of the pleated woven filter materials is a substantially pure solid elemental copper material located in at least a portion of an open air ventilation area, wherein said woven copper filter material has alternating interlaced and overlapping substantially pure copper fiber filaments forming a weave of substantially pure copper filter, said weave of alternating interlaced and overlapping substantially pure copper fiber filaments create pore spaces between the substantially pure copper fiber filaments so that air may be directed through the pore spaces thereby coming into contact with the copper on the surface of the substantially pure copper fiber filaments;
    said surface-enhanced weave of substantially pure copper filaments configured in a pleated manner to contact biological contaminants and other pollutants in an airflow of the open air ventilation area to come in contact with said biological contaminants;
    said filter housing having a frame with top, bottom, left side and right side u-shaped members surrounding the surface-enhanced copper filter;
    placing said filter housing in the filter assembly; said air ventilation system having a perforation to accommodate the exterior housing;

activating the ventilation system to create an air flow through the filter assembly, wherein the surface-enhanced copper filter removes biological contaminants and other pollutants from the air, inactivating said biological contaminants; and, returning air to the environment after removal of biological contaminants and other pollutants from the air, and inactivating said biological contaminants.

13. The method of claim 12, wherein the surface-enhanced copper filter is substantially pure copper on substantially all the surfaces of the fiber filaments, said substantially pure copper filaments are interlaced into a woven copper material.

14. The method of claim 12 wherein the filter housing further comprises:

one or more supports dimensioned to overlie said surface-enhanced copper filter, said supports being wire, coated wire, plastic, or polymer.

15. A mobile air purification system comprising:

a cabinet having front panel, a right side panel, a left side panel, a back panel, a top panel and a floor panel, with each panel configured to create a box structure with an internal space, said cabinet having a removable door on the front panel and a plurality of locking casters coupled to said floor panel of said cabinet so that it can be moved and relocatable;

said internal space of said cabinet having a control panel for operating the mobile system, a motor and fan, an air intake, a supply plenum, one or more louvers, and a filter housing having a first plane located internal to the filter housing;

a power cord coupled to the control panel and motor to provide power to the system components;

said cabinet housing having one or more pre-filters located near the air intake for removal of particulates from the air; and, one or more surface-enhanced copper filters located in said filter housing, said surface-enhanced copper filter configured in a pleated manner and located in the first plane of said filter housing said surface-enhanced copper filter having a plurality of folded pleated filter material and at least one side of the folded pleated filter material having alternating interlaced and overlapping substantially pure copper fiber filaments forming a weave of substantially pure copper filter media composed of a substantially pure solid elemental copper material on at least a portion of the first plane of said filter housing; said surface-enhanced copper filter configured to contact biological contaminants and other pollutants in an airflow through the internal space of the housing.

16. The mobile air purification system of claim 15, wherein said filter housing has a frame with top, bottom, left side and right side u-shaped members defining a perimeter of the filter assembly with a narrow lip edge on each member to secure the copper filter media in the frame.

17. The mobile air purification system of claim 15, wherein said surface-enhanced copper filter is a a multi-layered non-woven copper material.

18. The mobile air purification system of claim 15, wherein said surface-enhanced copper filter has a plurality of in addition to the pleated folds to increase surface area for contact of the airflow to the fibrous copper filter material.

19. The mobile air purification system of claim 15, wherein said surface-enhanced copper filter is secured in said filter housing with one or more mesh supports dimensioned to overlie said copper filter and be secured in the frame by one or more lip of one or more frame members.

20. The mobile air purification system of claim 19, wherein said supportive mesh is wire, coated wire, plastic, polymer, or expanded polymer to support the copper filter and having an open construction to maximize airflow through the open front and/or back airflow areas of the frame.

* * * * *

UNITED STATES PATENT AND TRADEMARK OFFICE
CERTIFICATE OF CORRECTION

PATENT NO. : 11,969,679 B2
APPLICATION NO. : 17/206417
DATED : April 30, 2024
INVENTOR(S) : Matthew Mashburn et al.

It is certified that error appears in the above-identified patent and that said Letters Patent is hereby corrected as shown below:

In the Claims

Column 16, Claim 1, Line 1, after "placed" insert --in--
Column 16, Claim 1, Lines 28-29, after "purification" delete "using the solid elemental copper on the surface-enhanced copper fly"
Column 16, Claim 12, Line 66, after "exterior" insert --edge of the filter--
Column 18, Claim 18, Line 2, after "plurality of" insert --contours--

Signed and Sealed this
Thirtieth Day of July, 2024

Katherine Kelly Vidal
*Director of the United States Patent and Trademark Office*